United States Patent
Weber et al.

(10) Patent No.: US 9,380,268 B2
(45) Date of Patent: Jun. 28, 2016

(54) PROVISION OF VIDEO CONFERENCING SERVICES USING REFLECTOR MULTIPOINT CONTROL UNITS (MCU) AND TRANSCODER MCU COMBINATIONS

(71) Applicant: Blue Jeans Network, Mountain View, CA (US)

(72) Inventors: Emmanuel Weber, San Jose, CA (US); Alagu Periyannan, Sunnyvale, CA (US); Michael Grupenhoff, San Jose, CA (US); Prasad R. Mohire, Menlo Park, CA (US); Umesh S. Chandak, San Jose, CA (US)

(73) Assignee: Blue Jeans Network, Mountain View, CA (US)

( * ) Notice: Subject to any disclaimer, the term of this patent is extended or adjusted under 35 U.S.C. 154(b) by 176 days.

(21) Appl. No.: 14/216,401

(22) Filed: Mar. 17, 2014

(65) Prior Publication Data

US 2014/0267577 A1  Sep. 18, 2014

Related U.S. Application Data

(60) Provisional application No. 61/798,194, filed on Mar. 15, 2013, provisional application No. 61/803,310, filed on Mar. 19, 2013, provisional application No. 61/803,491, filed on Mar. 20, 2013.

(51) Int. Cl.
*H04N 7/14* (2006.01)
*H04N 7/15* (2006.01)
(Continued)

(52) U.S. Cl.
CPC ............ *H04N 7/152* (2013.01); *H04L 12/1822* (2013.01); *H04L 65/105* (2013.01); *H04L 65/1006* (2013.01); *H04L 65/1069* (2013.01); *H04L 65/4046* (2013.01)

(58) Field of Classification Search
CPC ............ H04L 12/1822; H04L 65/1006; H04L 65/105; H04L 65/1069; H04L 65/4046
USPC .................. 348/14.01–14.16; 370/259–271, 370/351–357; 379/201.01, 202.01–207.01; 709/201–207, 217–248
See application file for complete search history.

(56) References Cited

U.S. PATENT DOCUMENTS 6,944,136 B2 * 9/2005 Kim et al. ..................... 370/260
7,176,957 B2 * 2/2007 Ivashin et al. .............. 348/14.09
(Continued)

FOREIGN PATENT DOCUMENTS

EP     1372302 A2    12/2003

OTHER PUBLICATIONS

International Search Report and Written Opinion mailed Sep. 9, 2014, from the European Patent Office, for International Patent Application No. PCT/US2014/030045 (filed Mar. 15, 2014), 9 pgs.
(Continued)

*Primary Examiner* — Hemant Patel
(74) *Attorney, Agent, or Firm* — Ascenda Law Group, PC

(57) ABSTRACT

Embodiments are described for provision of video conferencing with reflector MCUs, transcoder MCUs, and/or combinations thereof. In some embodiments, a protocol connector module of a video conference system receives information on multi-data stream composition capabilities of a client application for a participant endpoint device of a video conference, session state information is received for creation of a composite of received video conference data streams for presentation at the client application, and instructions are selectively sent for handling media processing for each of the received video conference data stream from other participant devices based on the received multi-data stream composition capabilities information of the client application.

18 Claims, 10 Drawing Sheets

(51) Int. Cl.
*H04L 29/06* (2006.01)
*H04L 12/18* (2006.01)

(56) References Cited

U.S. PATENT DOCUMENTS

2006/0092269 A1 5/2006 Baird et al.
2011/0279634 A1 11/2011 Periyannan et al.

OTHER PUBLICATIONS

Amendment filed Feb. 1, 2016, for European Patent Application No. 14722470.3 (filed Mar. 15, 2014), 17 pgs.

* cited by examiner

US 9,380,268 B2

PROVISION OF VIDEO CONFERENCING SERVICES USING REFLECTOR MULTIPOINT CONTROL UNITS (MCU) AND TRANSCODER MCU COMBINATIONS

CROSS REFERENCE TO RELATED APPLICATIONS

This application is a NONPROVISIONAL of, claims priority to, and incorporates by reference in its entirety U.S. Provisional Application No. 61/798,194, entitled "System and Service for Providing Video Conferencing With Reflector MCU's and Transcoder MCU Combinations," filed on Mar. 15, 2013, U.S. Provisional Application No. 61/803,310, entitled "System and Service for Providing Video Conferencing With Reflector MCU and Transcoder MCU Combinations," filed on Mar. 19, 2013, and U.S. Provisional Application No. 61/803,491, "System and Service for Providing Video Conferencing With Reflector MCU and Transcoder MCU Combinations," filed on Mar. 19, 2013.

FIELD OF THE INVENTION

The present invention is directed to provision of video conferencing with reflector MCUs, transcoder MCUs, and/or any combinations thereof.

BACKGROUND

Typically, in conventional approaches as shown in FIG. 1, a reflector MCU 105 is designed as a monolithic application containing all control logic (for protocols 113 and the RTP pump 109) for intended processing which is not a fault tolerant design and such an implementation is prone to failure. When the reflector MCU 105 fails, the entire call may fail because the reflector handles the entire call. Furthermore, when bridging a conventional reflector MCU 105 with a conventional transcoder MCU 107, only one audio and video channel is used (e.g., between 109 and 111) because the transcoder MCU 107 can only accommodate one audio and video stream connected to it on each of its call legs from the endpoints.

This audio/video stream is either a switched stream or a mixed/composited stream. A switched stream allows only one of the reflector participants' audio or video to be seen on the transcoder MCU 107. A mixed/composited stream allows only all of the transcoder MCU 107 participants to be seen on the reflector MCU 105 in a composited form and limits the customer experience.

Attempts at achieving greater audio quality with conventional approaches have required tradeoffs. Specifically, if resources are used on the reflector for the mixing then it limits the scalability of the approach, and if the reflector acts a pure switching reflector then only one active speaker is heard on the transcoder side, resulting in a poor solution. As such, an improved approach to video conferencing systems with transcoder and reflector MCUs is needed to achieve higher scale and increased reliability and at the same time maintain the best customer experience.

SUMMARY

Embodiments are described for provision of video conferencing with reflector MCUs, transcoder MCUs, and/or combinations thereof. In some embodiments, a protocol connector module of a video conference system receives information on multi-data stream composition capabilities of a client application for a participant endpoint device of a video conference, session state information is received for creation of a composite of received video conference data streams for presentation at the client application, and instructions are selectively sent for handling media processing for each of the received video conference data stream from other participant devices based on the received multi-data stream composition capabilities information of the client application.

DETAILED DESCRIPTION

Figure 1:
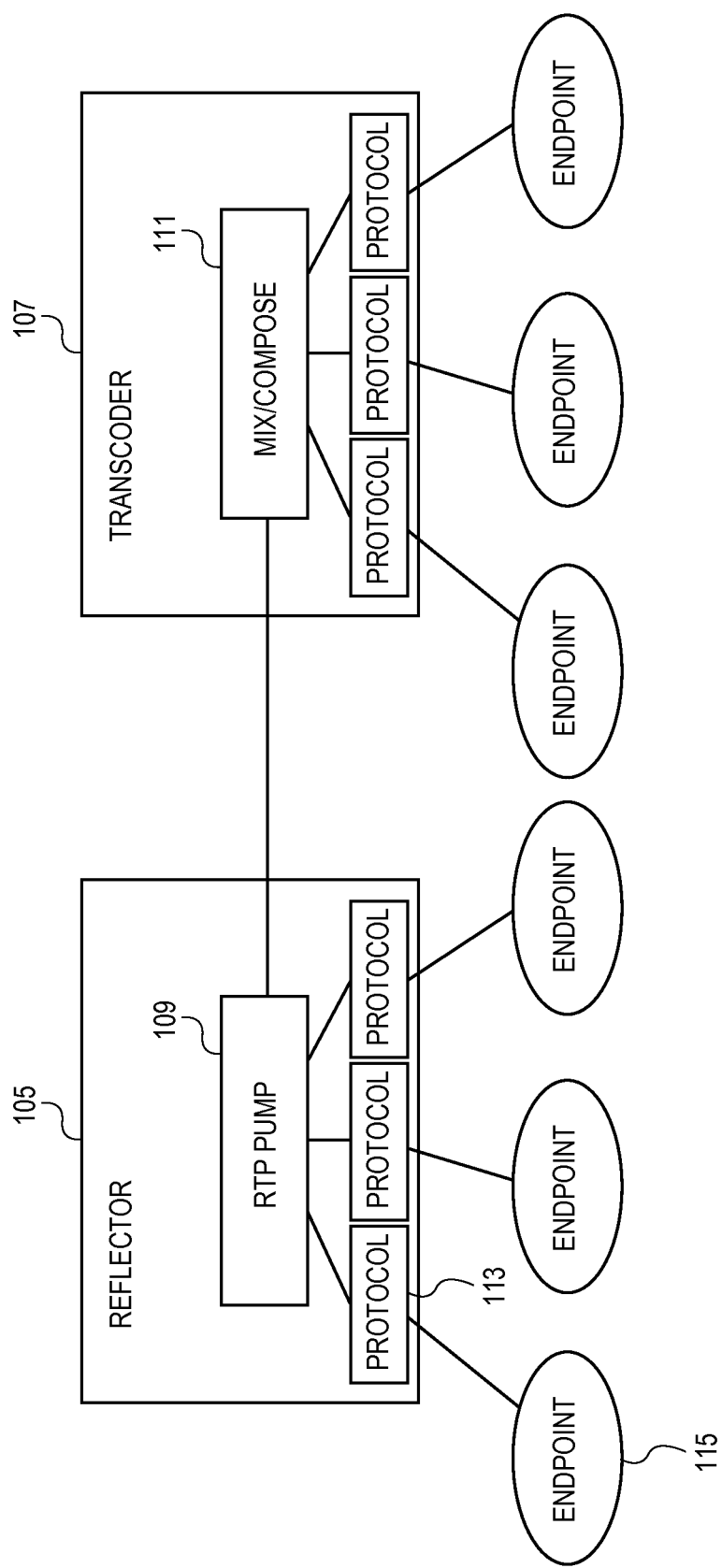
FIG. 1 is a system for a conventional approach.

Embodiments of apparatuses, computer systems, computer readable mediums, and methods for video conferencing systems using reflector multipoint control units (MCUs), transcoder MCUs, and/or any combination thereof are described. In some embodiments, a stateless reflector MCU is provided for support of a video conference. The state of the video conference may be stored and managed by other elements of the video conference system to perform media processing functionality, thereby allowing providing a fault tolerant solution where the stateless reflector may fail and not bring down the entire video conference because state is maintained elsewhere. In some embodiments, the stateless reflector MCU may be restarted without call or video conference interruption.

For example, this may be achieved with the use of protocol components (e.g., protocol connectors) that keep the session state information separate (e.g., extracted) from the reflector and running the protocol connectors in isolation, one per end point. Continuing with the example, if the reflector fails, the protocol components can recreate the reflector from scratch (e.g., a protocol connector can instantiate a reflector module instance and/or provide instructions to a manager for the reflectors).

Similarly, in some embodiments, each protocol component may run in isolation, typically one per call leg (e.g., one per conference participant data stream), both in hardware and software. Thus, failure of one protocol component may result only in one leg of the conference at most failing.

Higher audio and video quality may be achieved by using a multiple data stream and scalable data stream technologies. Multiple streams are used in cases where different bandwidth levels can be supported in by subscribing to a stream that is best suited for a given bandwidth condition between two communicating entities. Scalable streams are used when a single stream can scale up and down in bandwidth using a scheme of layered sub-streams. Endpoints with applications capable of handling multiple streams and scalable creation of composite data streams connect to the reflector MCU, and such capable endpoints do the audio mixing and video compositing at the endpoint. This allows the system to provide a scalable solution by pushing work to client applications where there are available resources to allow for server resources of the system to be used to handle other endpoints.

Other endpoints that may not have these multiple stream capabilities connect to the transcoder MCU. The connection between the reflector and transcoder MCU supports multiple streams and scalable streams, which allows higher quality to be achieved for all types of end points in a single conference. It also achieves interoperability with legacy endpoints which are incapable of handling multiple streams to provide a quality experience with the best quality possible from any other endpoint whether it is multiple streams capable or a legacy end point. Larger conferencing is achieved by pushing audio and video processing out to the endpoints instead of running it in the reflector itself whenever the endpoint is capable of handling multiple streams.

Both reflector and transcoder MCUs manage the bandwidth on each video conference leg in a manner best suited for the endpoint at the other end so that a quality experience is achieved. Upshifting and downshifting the audio/video compression rate using a transcoding MCU may handle bandwidth variations between the MCUs and on legacy endpoints. Multi-stream and scalable stream capable endpoint bandwidth variations may be handled by switching between various scalable streams, adding or dropping streams, upshifting and downshifting frame rates or filtering layers in scalable streams.

An object of the present invention is to provide a system and services for video conferencing that may provide for much larger conferences with higher quality experience. A further object of the present invention is to provide a system and services for video conferencing that is a scalable, fault tolerant solution. Another object of the present invention is provide a system and services for video conferencing that can work with end points that are capable of receiving multiple streams and doing local audio mixing and video compositing, and at the same time can work with legacy endpoints that require all the mixing and compositing to be done at the MCU and a single stream sent to them. A further object of the present invention is to provide a system and services for video conferencing that provides for fewer disruptions due to hardware and/or software failures. And, yet a further object of the present invention is to provide a system and services for video conferencing that provides the ability to scale to a massive conference consisting of proprietary as well as legacy endpoints.

The video conference system configured in accordance with some embodiments of the present invention may provide a user interface for presentation of the received data streams for a video conference. In some embodiments, the video conference system may support the operation of a video conference, such as a conference with a virtual media room or virtual meeting room (VMR) user interface, wherein each VMR user interface may present data from a plurality of endpoints (e.g., devices of participants in the video conference) at one or more geographic locations. Examples of approaches to video conference systems that may be practiced in some embodiments are provided in U.S. patent application Ser. No. 13/105,691, entitled "Systems and Methods for Scalable Composition of Media Streams for Real-Time Multimedia Communication," filed on May 11, 2011 (issued as U.S. Pat. No. 8,482,593 on Jul. 9, 2013), U.S. patent application Ser. No. 13/105,684, entitled "Systems and Methods for Real-time Multimedia Communications Across Multiple Standards and Proprietary Devices," filed on May 11, 2011, U.S. patent application Ser. No. 13/919,576, entitled "Systems and Methods for Scalable Composition of Media Streams for Real-time Multimedia Communication," filed on Jun. 17, 2013, U.S. patent application Ser. No. 13/105,699, entitled "Systems and Methods for Scalable Distributed Global Infrastructure for Real-time Multimedia Communication," filed on May 11, 2011 (issued as U.S. Pat. No. 8,514,263 on Aug. 20, 2013), U.S. patent application Ser. No. 13/955,646, entitled "Systems and Methods for Scalable Distributed Global Infrastructure for Real-time Multimedia Communication," filed on Jul. 31, 2013, U.S. patent application Ser. No. 13/105,704, entitled "Systems and Methods for Security and Privacy Controls for Videoconferencing," filed on May 11, 2011, U.S. patent application Ser. No. 13/105,716, entitled "Systems and Methods for Shared Multimedia Experiences in Virtual Videoconference Rooms," filed on May 11, 2011, U.S. patent application Ser. No. 13/105,719, entitled "Systems and Methods for Novel Interactions with Participants in Videoconference Meetings," filed on May 11, 2011, U.S. patent application Ser. No. 13/105,723, entitled "Systems and Methods for Real-time Virtual-reality Immersive Multimedia Communications," filed on May 11, 2011, and U.S. patent application Ser. No. 13/251,913, entitled "Systems and Methods for Error Resilient Scheme for Low Latency H.264 Video Coding," filed on Oct. 3, 2011, each incorporated herein by reference in its respective entirety.

The video conference system is described in more detail with reference to FIGS. 2 and 3, and, as illustrated, may support a variety of video conferencing feeds of audio, video, audio and video, and/or other media data streams from video conferencing participant endpoints to present a video conference. Endpoints may be any type of device, including, but not limited to: laptops, computers, smartphones, tablets, phones, audio and video conferencing system devices, and/or any other device capable of sending and receiving data streams over a network. Participants may use proprietary or standards-based communication protocols with their devices, and the video conference system may enable a multi-party and/or point-to-point (e.g., between two endpoints) video conference session among the plurality of participant endpoints.

As a non-limiting example, video data streams from proprietary video conference endpoints using proprietary communication protocols implemented for client applications include, but are not limited to, the following: Microsoft Skype application, Polycom video conference applications, Microsoft Lync applications, Google Talk applications, web applications capable of real time communication, and/or any other application providing communication services. Video data streams from standards-based video conference endpoints, include, but are not limited to, H.323 and Session Initiation Protocol (SIP). Additionally, the video conference system may support data streams from a media gateway that converts digital media streams between disparate telecommunication networks, such as from devices using public switched telephone networks (PSTN), SS7, and Next Generation Networks. Each video conference can be implemented and supported across an infrastructure of a globally distributed set of commodity servers acting as media processing nodes co-located in Points of Presence (POPs) for Internet access, wherein such a distributed architecture can support thousands of simultaneously active video conferences in a reservation-less manner and that is transparent to the user participants. Each video conference provides users with a rich set of conferencing and collaboration interaction.

These interactions encompass the control of a video conference session, its configuration, the visual layout of the data streams from the conference participants, customization of the user interface, and adaptation of a video conference to integrate with and present data streams from different client applications (e.g., chat, whiteboards, Microsoft Skype, etc.). For a non-limiting example, one such use of the video conference system is to facilitate conferences between two disparate endpoints such as a client application for a proprietary system from a communication service provider (e.g., a Skype client) and an application for a standards-based H.323 endpoint. Continuing with the example, the Skype user may initiate a video conference with another user and have no knowledge of the other user's endpoint technology (e.g., client application), and the video conference system may host a video conference session and instantiate media processing components/elements to translate data streams (as needed), transcode data streams (as needed), and create a composite of data streams received from the disparate endpoints.

A globally distributed infrastructure for the video conference system supports the sharing of the event (e.g., the session) among the participants at geographically distributed locations with the use of a plurality of MCUs (Multipoint Control Units), each configured to process the plurality of audio and/or video streams from the plurality of video conference endpoints in real time. Those with skill in the art will recognize that a globally distributed infrastructure is not required to practice the invention. A geographically distributed architecture and/or simply a distributed architecture may be implemented to practice the invention.

Compared to conventional video conference system approaches that require every participant to the video conference to follow the same communication standard or protocol and/or use the same client application from a communication service provider, a video conference supported by the globally distributed infrastructure with at least one MCU at a media server allows the participants of a video conference to participate in a multi-party or point-to-point video conference session in device, address scheme, protocol, and/or communication service provider independent fashion. By conducting manipulation of the video and audio streams transparently in on a remote server (e.g., a server of a POP that is accessible via one or more networks or networks of networks) without end user involvement, the proposed approach brings together video conference systems and applications of different devices, different protocols of video conferencing, and/or different communication services from communication service providers as one integrated system. Communication service providers may include, but are not limited to, the following: providers of Voice over Internet Protocol (VoIP), instant messaging services supporting voice and/or data, and/or service provider with applications that allow for transport of information electronically.

In particular, the video conference system provides the integration of services from different communication service providers (e.g., Skype, and Google Talk) that support different addressing schemes for identifying users on devices. For example, a participant user may login to a Skype client to join a video conference using a communication service identifier (e.g., username, Skype id) and communicate with a participant user who logins to a Google Talk client using an email address. Ordinarily, a communication service provider may require a user to identify each participant on the communication session with an identifier registered with the communication service (e.g., communication service identifier, email address, username, etc.), so that the communication service provider may look up the address of the user endpoint to communicate, and the communication service provider may not support integration with other communication services. The video conference system integrates with the communication service provider services/system seamlessly for the user, so that the user can login with any client application with an identifier registered with the communication service provider and participate in the video conference.

In some embodiments, the endpoint for a participant using a client application is communicating with a corresponding client application for the communication service provider executing as a virtual client application on a server in the backend. A virtual client application is a client application that may be executed on a server of the video conference system to receive data streams from the client application executing on a participant endpoint device, and the output or presentation of the data streams within the virtual client application may be captured and combined with other data streams to form a composite for the video conference. Examples of approaches to video conference systems that support different communication services are provided in U.S. patent application Ser. No. 13/105,684, entitled "Systems and Methods for Real-Time Multimedia Communication across multiple standards and proprietary devices" filed on May 11, 2011, and U.S. patent application Ser. No. 14/217,275, "Method and Systems for Interfacing Heterogeneous Endpoints and Web-based Media Sources in a Video Conference," filed Mar. 17, 2014, each incorporated herein by reference in its respective entirety.

Hosting the video conference on at least one media server accessible on a network (e.g., Internet/cloud) allows for the participants to initiate a video conference with any device, supporting any communication protocol, and any client application from a communication service provider, have the system communicate with the other participants at each of their selected endpoint devices, and the other participants may accept the request to join the video conference from any endpoint device using any client application from any communication service provider that he/she wishes. A video conference hosted on a server accessible over the Internet/cloud enables any participant to be able to upload media content to a server (i.e., a node) of the global distributed infrastructure accessible over the Internet (e.g., in the cloud) and have it be retransmitted to other participants in formats of their choice transparently, with or without modifications.

Distributed Infrastructure

Figure 2:
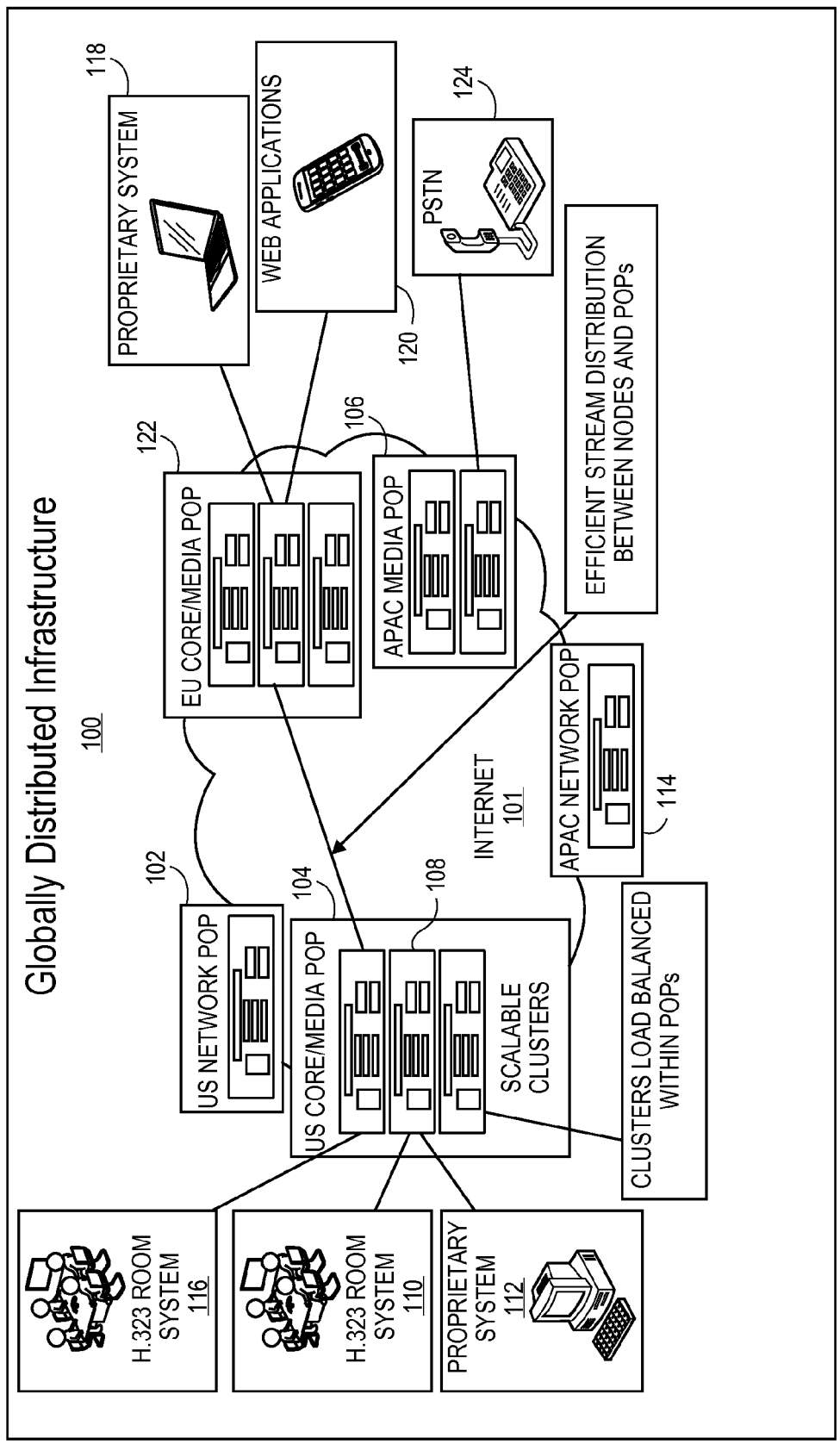
FIG. 2 depicts an exemplary system in accordance with some embodiments of the invention.

FIG. 2 depicts an exemplary system, in accordance with some embodiments of the invention. As shown in FIG. 2, to support the operations of video conferencing, one or more media processing nodes (known in the industry as an MCU) (e.g., nodes of 102, 104, 106, 114, and 122) are used to process and compose video conference feeds from various endpoints, and in particular, the media processing nodes of the globally distributed infrastructure 100 are able to offer a multi-protocol bridging solution to deliver content to disparate endpoints. In the example of FIG. 2, a globally distributed infrastructure 100 enables efficient and scalable processing and compositing of media streams by building the MCUs as the media processing nodes (e.g., 102, 104, 106, 114, and 122) for video stream processing from off-the-shelf components, such as Linux/x86 Central Processing Units (CPUs) and PC Graphics Processing Units (GPUs) instead of custom hardware. These MCUs can be deployed in a rack-and-stack cloud-computing style and hence achieves the most scalable and cost/performance efficient approach to support the video conferencing service. The x86 architecture has improved vastly over the years in its Digital Signal Processing (DSP) capabilities and is able to now support the processing for the video conference system. Additionally, off-the-shelf GPU used for rendering PC graphics can be used to augment the processing power of the CPU and/or any other processor.

In the example of FIG. 2, the globally distributed infrastructure 100 that supports and enables the operations of the video conference has at least one or more of the following attributes:

(1) Ability to support wide variety of audio video formats and protocols;

(2) Scalable mixing and composition of the audio and video streams;

(3) Service delivered across the globe with minimized latency; and (4) Capital efficient to build and cost efficient to operate.

In some embodiments, globally distributed infrastructure 100 may be implemented with clusters of x86 servers both locally on a LAN as well as across geographies serving as the media processing nodes for the MCUs to achieve near unlimited scaling. All of the media processing nodes of the clusters (e.g., 102, 104, 108, 106, and 114) may work together forming one giant MCU. In some embodiments, such clustered design makes use of network layer multicast and a novel multi-bit-rate stream distribution scheme to achieve the unlimited scaling. The globally distributed infrastructure 100 is able to achieve great scalability in terms of the number of participants per call, geographic distribution of callers, as well as distribution of calls across multiple POPs worldwide.

By way of a non-limiting example, globally distributed infrastructure 100 has the media processing node MCUs distributed around the globe in POPs (e.g., United States (US) Network POP 102, US Core Media POP 104, Asia Pacific (APAC) Media POP 106, APAC Network POP 114, and European Union (EU) Core Media POP 122) at data centers (e.g., third party data centers) to process video conference feeds coming from video conference endpoints having different communication protocols and/or using different client applications from communication service providers. Those with skill in the art will recognize that an implementation of the globally distributed infrastructure 100 for the video conference system with the same number and/or geographic locations for Core Media and/or Network POPs of FIG. 2 is not required and any number of Core Media POPs and Network POPs may be used to provide a content delivery network 103 for a video conference system. In some embodiments, each Core/Media POP may have the processing power (e.g., servers) to handle the load for that geographical region where the POP is located. Users/participants connecting to the video conference system may be directed to the closest Core Media POP (e.g., the "connector" at a POP, described in more detail with FIG. 3) that can handle the processing for the conference so as to allow them to minimize their latency.

Once the participants are in communication with a POP of the globally distributed infrastructure 100, their conference feeds of audio and video streams can be carried on a high performance network POPs (e.g., US Network POP 102, APAC Network POP 114) between the POPs. Additionally, in some embodiments, Network POPs (e.g., US Network POP 102, APAC Network POP 114) can be used for communication (e.g., traffic) with users in places where a Core Media POP does not exist. By way of example, an endpoint can communicate with a Network POP in a more optimal location for communication than the nearest Core Media POP, and the Network POP may send/forward the traffic to a Core Media POP over a private dedicated network so as to avoid use of the open Internet. The globally distributed infrastructure 100 enables media processing nodes to act as one single system.

FIG. 2 depicts an example of a system for media stream distribution processing that may be achieved locally on a Local Area Network (LAN) present in each POP and/or across multiple POPs on the Wide Area Network (WAN). For example, media stream distribution may be handled with a single node media distribution using a single POP (as shown with the use of server 108), where video conference feeds from participants to a video conference via for non-limiting examples, room systems running H.323 (as shown with 110), PCs running H.323, PCs running Skype (as shown with 112), all connect to one node in a POP (as shown with 108) based on proximity to the conference host, where the video conference feeds are load balanced but not clustered among nodes in the POP. In another example, media stream distribution may be handled with clustered nodes media with a POP (as shown with 104), wherein video conference feeds from the participants (e.g., 110, 112, and 116) are load balanced among cluster of nodes at the POP, and the audio/video streams are distributed/overflowed among the nodes in the POP. In another example, media stream distribution processing may be handled with complete media distribution among both the cluster of nodes within the POP (e.g., 104) and among different POPs (e.g., 102, 106, 114, and 122) as well, where some participants to the conference may connect to their closest POPs (e.g., 118 and 120 connect to 122, and 124 connects to 106) instead of a single POP.

In some embodiments, the globally distributed infrastructure 100 may have multiple other globally distributed private networks to connect to it, including, but not limited to, deployments of video conferencing services such as Microsoft Lync that require federation (i.e. cooperation among multiple organizational entities) at edge nodes and translation and decoding of several communication and transport protocols.

Figure 3:
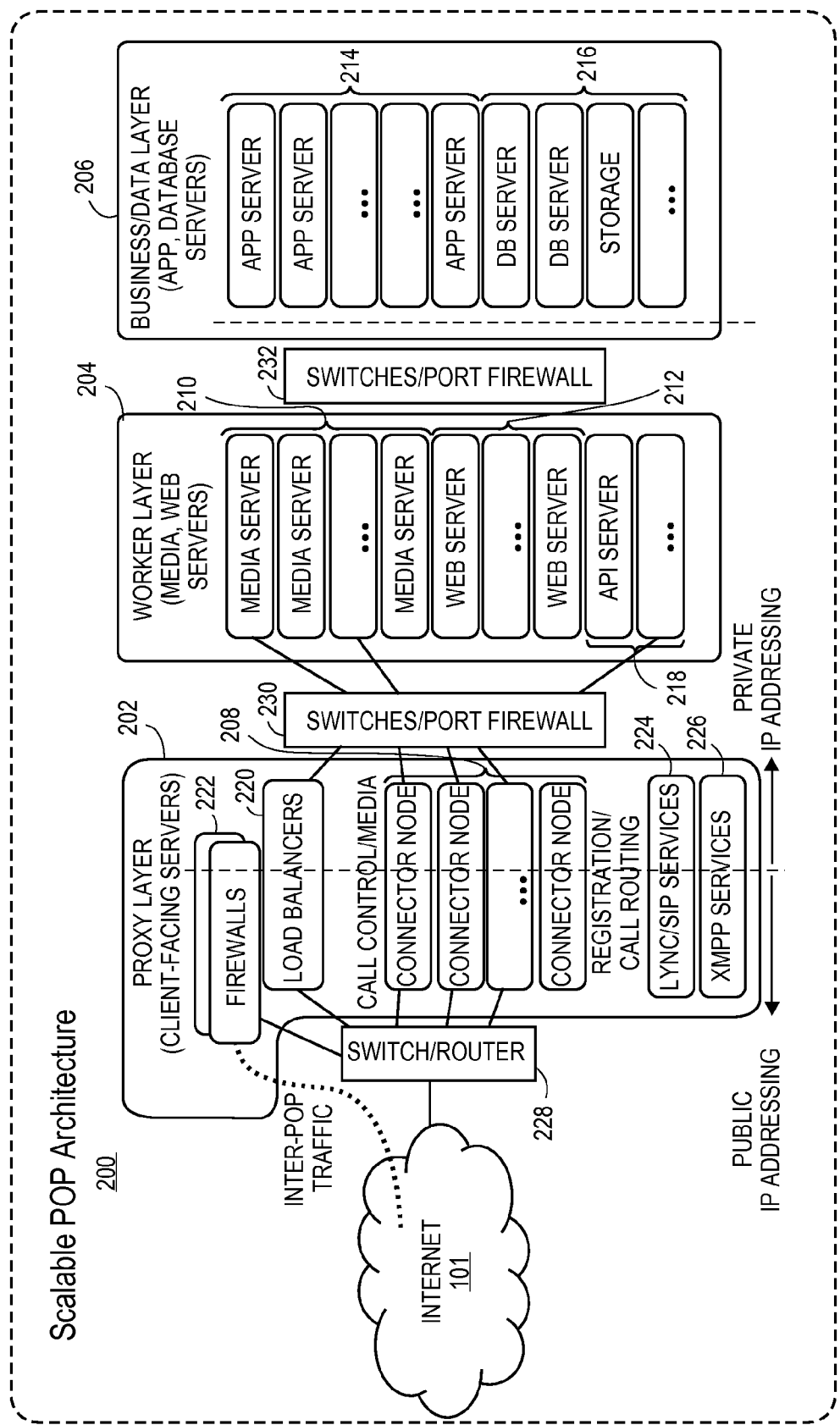
FIG. 3 depicts an exemplary system in accordance with some embodiments of the invention.

FIG. 3 depicts an exemplary system in accordance with some embodiments of the invention. FIG. 3 depicts a Scalable POP Media Processing Node Architecture 200 (e.g., architecture for POPs 102, 104, 106, 114, and 122) accessible over a network 101 with a Proxy Layer 202, a Worker Layer 204, and a Business/Data Layer 206. Some of the components/elements of the Scalable POP Architecture 200, include but are not limited to, the following: load balancers 220, firewalls 222, media servers collectively 210 for processing data streams (e.g., transcoding, compositing, mixing and/or echo cancellation among H.26x, G.7xx, and SILK), protocol connector nodes collectively 208 for handling call and/or media processing control for endpoints of video conference (e.g., for H.323, Skype, SIP, XMPP, and NAT traversal), servers for handling particular communication services or protocols (e.g., LYNC, SIP services 224, and XMPP services 226), web servers collectively 212, application programming interface (API) servers 218, data storage collectively 216 (e.g., database (DB) servers and other storage), and applications servers collectively 214 for supporting web applications (e.g., for providing functionality to the user, such as conference control, screen and presentation sharing, chat, etc.). The components may be distributed across the nodes and/or POPs of the globally distributed infrastructure 100 for enabling real-time or nearly real-time communication. Components may be connected on a network and can communicate over networks utilizing switches and routers as shown with 228, 230, and 232.

Some components, which include, but are not limited to, the following components: user/account management, billing system, NOC (Network operation center) systems for bootstrapping, monitoring, and node management may be run at one or more centralized but redundant management nodes in the Business/Data Layer 206. Other components, which include but are not limited to, common application framework and platform (e.g., Linux/x86 CPUs, GPUs, package management, clustering) can be run on both the distributed nodes and the centralized management nodes.

Each of the protocol connector nodes 208 in the Proxy Layer 202 may receive audio video data streams utilizing proprietary or standards based communication protocols and may translate the received data into a common protocol (e.g., Real Time Transport Protocol (RTP)). The received data in the common protocol may then be sent to media servers for transcoding and composition/mixing by media servers 210 of the Worker Layer 204, such operation of the media servers 210 used to form composite data streams for the endpoints. Translating (when needed) may include receiving the data packets of a data stream communicated using a first communication protocol and retransmitting the received data packets using a second communication protocol. While the communication protocol in which the data stream is communicated is changed, the actual data packets may remain unchanged. In contrast, transcoding (when needed) may include decoding data (e.g., data packets) in a received first communication protocol to an intermediate format and encoding the data into a common target format for a common, target communication protocol. Other implementations may provide for transcoding to be performed at the proxy layer 202 with a protocol connector node 208.

In some embodiments, global infrastructure 100 provides a high-level mechanism for fault tolerant protocol handling to prevent improper input from causing instability and possible security breach via protocol connector 208 or media servers 210. Media processing tasks by protocol connectors 208 and/or media servers 210, such as processing of protocol control messages and compressing audio and video streams may be isolated in one or more separate, independent, unprivileged processes. More specifically, (1) Separate processes: each incoming connection may cause a new process to be created by protocol connector node 208 or media server 210 to handle it. This process may be responsible for decompressing the incoming media stream, translating the incoming control messages into internal API calls, and decompressing the media into an internal uncompressed representation. For a non-limiting example, inbound H.264 video can be converted into YUV420P frames before being passed on to another process. In this way, if this process crashes, no other part of the system may be affected except the conference endpoint handled by that process.

(2) Independent processes: each connection may be handled in its own process. A given process in a protocol connector node 208 or media server 210 may be responsible for one videoconference endpoint, so that if this process crashes, only that single endpoint will be affected and everyone else in the system will not notice anything.

(3) Unprivileged processes: each process should be as isolated as possible from the rest of the system. In some embodiments, to accomplish this, ideally each process runs with its own user credentials, and may use the chroot( ) system call to make most of the file system inaccessible.

(4) Performance considerations: protocol connector 208 or media server 210 may introduce several processes where typically only one exists and brings about the possibility of performance degradation, especially in a system handling audio and video streams where a large amount of data needs to be moved between processes. To that end, shared memory facilities can be utilized to reduce the amount of data that needs to be copied.

In some embodiments, media-processing servers 210 are designed to convert and compose several videoconference feeds of video and audio streams in real-time to create and render one or more composite multimedia streams for each participant to the video conference (e.g., VMR). Media-processing servers 210 may include as its components one or more of: video compositor, video transcoder, distributed multicast video switch, audio transcoder/pre-processor, distributed multicast audio mixer, and each component may be in communication with protocol connector 208 and a distributed conference session controller. In the case of video, the video streams from the participants are made available at the media processing server 210 in three (or more) forms: original compressed video, uncompressed raw video, and a lower resolution compressed thumbnail video.

By way of example, a video compositor of a module executing on a media processing node 210 subscribes to whichever video stream it needs based on the set of videos needed to compose and be rendered to the participants. The two (or more) compressed forms of the video streams listed above may be transcoded by video transcoder sent by distributed multicast video switch using a multicast address on the network so that other (remote) media processing nodes that want these video streams can subscribe to them as needed. This scheme allows the entire cluster of nodes (locally and globally) to share and/or exchange the audio and video streams they need in the most efficient manner. These streams could be transmitted over the public Internet, over a private network or over a provisioned overlay network with service level guarantees. Using this approach, video compositor may show various composites, including but limited to, just the active speaker, two people side-by-side if they are having a conversation, and any other custom format as requested by a participant, which may include transformations of the video into other representations as well. Continuing with the example, a video transcoder of media processing server 210 encodes and decodes composite video streams efficiently, where characteristics of each individual stream can be extracted during decoding.

In some embodiments, video compositor not only composes the raw video stream into a composite video stream but also builds up a composite metadata field in order to apply similar operations (including both 2D and 3D operations) outlined in the metadata field to the individual video streams of the composite video. As a non-limiting example, motion vectors need to be applied with the same transformation that video compositor may apply to each raw video stream, including but not limited to, scaling, rotation, translation, shearing. This metadata could be used for other non-real-time multimedia services including but not limited to recorded streams and annotated streams for offline search and indexing.

In some embodiments, application server 214 (e.g., a user experience engine) renders multimedia content including but not limited to the composite audio/video stream to each of the participants to the video conference for an enhanced User Experience (UE) for the participants. The UE provided by the application server 214 to the participants may comprise one or more of the following areas:

(1) Physical interaction with the video conference endpoint. The application server 214 provides a web application that enables controlling the setup and management of a multi-party video conferencing session in a device/manufacturer independent way. Most of the physical interaction with the manufacturer supplied remote control can be subsumed by a web application, wherein the web application can be launched from any computing or communication device, including laptop, smart phones or tablet devices. In some embodiments, these interactions could be driven through speech or visual commands as well that the Internet/cloud based software recognizes and translates into actionable events.

(2) User interface (UI) associated with a web application allows the participants to interact with the video conference system for video conference session. Here, application server 214 controls the interaction of the moderator and the conferencing participants. Through an intuitive UI provided by application server, participants to the video conference can control such features such as video layouts, muting participants, sending chat messages, screen sharing and adding third-party video content.

(3) Video/Multimedia content. Application server 214 controls content rendered in the form of screen layouts, composite feeds, welcome banners, etc. during the video conference as well as what the participants see when they log into a video conference, what they physically see on the screen etc. In some embodiments, the UI and/or the multimedia content could contain information related to performance metrics for the participant's call experience, including but not limited to video resolution, video and audio bitrate, connection quality, packet loss rates for the connection, carbon offsets gained as a result of the call, transportation dollars saved and dollars saved in comparison to traditional MCU-based calls.

(4) Customization of the video conference session for a specific (e.g., vertical industry) application. Application server 214 allows customization of the user interface in order to tailor a video conference session to the needs of a particular industry so that the conference participants may experience a new level of collaboration and meeting effectiveness. Such vertical industries or specialties include but are not limited to, hiring and recruiting, distance learning, telemedicine, secure legal depositions, shared-viewing of real-time events such as sports and concerts and customer support.

(5) Personalization of the video conference as per the moderator's and/or the participants' preferences and privileges. Application server 214 provides the moderator the ability to personalize the meeting when scheduling a video conference. Examples of such customization include but are not limited to, the initial welcome banner, uploading of meeting agenda, specifying the video layouts that will be used in the session and privileges given to the session participants.

Despite the fact that most conventional video conference systems cost tens of thousands of dollars, they offer very limited freedom and flexibility to the call organizer or to any participants in terms of controlling the user experience during the call. The layouts come pre-configured to a select few options, and the settings that can be modified during a call are also limited.

In some embodiments, application server 214 provides moderator-initiated in-meeting/session management and control over security and privacy settings during a particular video conference call, wherein such management and control features include but are not limited to, muting a particular speaker at the video conference, controlling and/or broadcasting layouts associated with one of the video conference endpoints to all or a subset of the participants, and sharing additional materials selectively with a subset of the participants (for a non-limiting example, in an HR vertical application where multiple interviewers are interviewing one candidate in a common call).

By offering the video conferencing service over the Internet/cloud, application server 214 eliminates a lot of these limitations of the conventional video conference systems. For a non-limiting example, application server 214 enables participant's associated different types of video conference endpoints to talk to each other over the Internet during the video conference. For a non-limiting example, participants from H.323 endpoints can to talk to participants from desktop clients such as Skype, and both the moderator and the participants can choose from a wide variety of options. In addition, by providing the ability to terminate the service in the cloud, application server 214 enables access to a much richer set of features for a conference call that a participant can use compared to a conventional passively bridged conference call. More specifically, every participant can have control of one or more of:

(1) Which active participants to the session to view in his/her video windows on the screen of his/her video conference endpoint.

(2) Layout options for how the different participants should be shown on the screen of his/her video conference endpoint.

(3) Layout options on where and how to view the secondary video channel (screen sharing, presentation sharing, shared viewing of other content) on the screen of his/her video conference endpoint.

Using such in-meeting controls, a moderator can control security and privacy settings for the particular call in ways. The moderator of the call, in addition to the aforementioned options, has a richer suite of options to pick from through a web interface to manage and control the video conference, which include but are not limited to, (1) Muting subsets of participants during a call.
(2) Sharing content with subsets of participants during the course of a call.
(3) Prescribing a standard layout of the screen of his/her video conference point and a set of displayed callers for other participants to see.
(4) Choosing to display caller-specific metadata on the respective video windows of a subset of the participants, including user-name, site name, and any other metadata.
(5) Easy and seamless way to add or remove participants from the video conference call through a real-time, dynamic web interface.
(6) Easily customizable welcome screen displayed to video callers on joining the call that can display information relevant to the call as well as any audio or video materials that the service provider or the call moderators wishes for the participants to see.

In some embodiments, application server 214 enables private conferences by creating sub-rooms in main VMR that any subset of the participants to the main VMR could join and have private chats. For a non-limiting example, participants can invite others for a quick audio/video or text conversation while being on hold in the main VMR.

A shared experience of events among participants to a video conference often requires all participants to be physically present at the same place. Otherwise, when it happens over the Internet, the quality is often very poor and the steps needed to achieve this are quite challenging for the average person to pursue this as a viable technological option.

In some embodiments, application server 214 provides collaborative viewing of events through VMRs that can be booked and shared among the participants so that they are able to experience the joy of simultaneously participating in an event and sharing the experience together via a video conference. For a non-limiting example, the shared event can be a Super Bowl game that people want to enjoy with friends, or a quick session to watch a few movie trailers together among a group of friends to decide which one to go watch in the theater.

In some embodiments, application server 214 utilizes the MCUs of the global infrastructure 100 to offer an easy, quick, and high-quality solution for event sharing. More specifically, application server 214 enables one initiating participant to invite a group of other participants for a shared video conference call via a web application. Once everyone joins in the VMR to share online videos and content, an initiating participant may provide a uniform resource locator (URL) where the content is located and the content may be streamed into a VMR directly from the content source whether the content is local to the initiating participant device or located remotely and accessed over the Internet from a third party web site or content store. Participants may continue to have conversations with other participants while watching this content. Other features provided include but are not limited to, altering the layout of the content in terms of where it is visible, its audio level, whether it should be muted or not, whether it should be paused or removed temporarily are in the control of the person sharing the content similar to the management and control by a moderator to a video conference as discussed above. Such an approach provides a compelling and novel way to watch live events among groups of people whose locations are geographically distributed, yet want to experience an event together. This enables a whole new set of applications around active remote participation in live professional events such as conferences and social events such as weddings.

In some embodiments, application server 214 enables multiple views and device-independent control by the participants to the video conference. Here, the video endpoints each have its own user interface and in the case of hardware video systems available in conference rooms, the video conference endpoints may each have a remote control that is not very easy to use. In order to make the user experience of connecting to the VMR simple, user experience engine 106 minimizes the operations that one need to carry out using the endpoints' native interface and moves all of those functions to a set of interfaces running on a device familiar to most users—desktop PC, laptop PC, mobile phone or mobile tablet, and thus makes the user experience to control the VMR mostly independent of the endpoint devices' user interface capabilities. With such device-independent control of the video conference, application server provides flexibility, ease-of-use, richness of experience and feature-expansion that it allows to make the experience far more personal and meaningful to participants.

In some embodiments, application server 214 may also allow a participant to participate in and/or control a video conference using multiple devices/video conference endpoints simultaneously. On one device such as the video conference room system, the participant can receive audio and video streams. On another device such as a laptop or tablet, the same participant can send/receive presentation materials, chat messages, etc. and also use it to control the conference such as muting one or more of the participants, changing the layout on the screens of the video conference endpoints with PIP for the presentation, etc. The actions on the laptop are reflected on the video conference room system since both are connected to the same VMR hosting the video conference.

Joining a video conference from H.323 endpoints today often involve cumbersome steps, which must be performed via a remote-control for the endpoint device. In addition to logistical issues such as locating the remote in a room, there are learning-curve related issues, such as finding the correct number to call from the directory, entering a specified code for the call from the remote, etc. In some embodiments, an endpoint can be setup to always just dial one number when it is turned on or woken up from sleep. Once the call is established, then a different user interface, such as a web application or mobile device client application, can be used to select which meeting to join.

In some embodiments, application server 214 provides a user experience with a user interface rendering to the participants welcome screen content that includes, but is not limited to, the following: an interactive welcome handshake, a splash screen, interactions for entering room number related info, and a welcome video, etc. for video conferences. To join a call from a video conference endpoint, all that the moderator needs to do is to call a personal VMR number he/she subscribes to. The moderator can then setup details for the call, including the rich media content that would form part of the welcome handshake with other participants, which may then be setup as default options for all calls hosted by the moderator. Other participants call into the VMR and enter the room number specified for the conference call. On joining the VMR, they first enjoy the rich media content setup as their welcome screen, including content specific to the call, such as an agenda, names of the parties calling in, company related statistics etc. Such content could also be more generic for non-business applications, including any flash content including videos, music, animations, advertisements, etc. Upon joining the call, the display also may show a code that is specific to the participant on his/her screen, which can be applied to the content on the call for content sharing. The code can also be entered from a web application used for the call or can be provided through voice or visual commands that are recognized and processed by software in the internet cloud that are then translated into actionable events.

Examples of a load balancing that may be practiced in some embodiments are provided in U.S. patent application Ser. No. 14/217,195, entitled "Provision of Video Conferencing with Load Balancing," filed Mar. 17, 2014, and incorporated herein by reference in its entirety. Examples of POPs within enterprise networks (e.g., Micro POPs) that may be practiced in some embodiments are provided in U.S. patent application Ser. No. 14/216,363, entitled "Provision of video conferencing services using a micro pop to extend media processing into enterprise networks," filed Mar. 17, 2014, and incorporated herein by reference in its entirety. Micro POPs may have a POP architecture 200 in a globally distributed infrastructure 100 for a conference system and offer a set of services to endpoints within an enterprise network.

Figure 4:
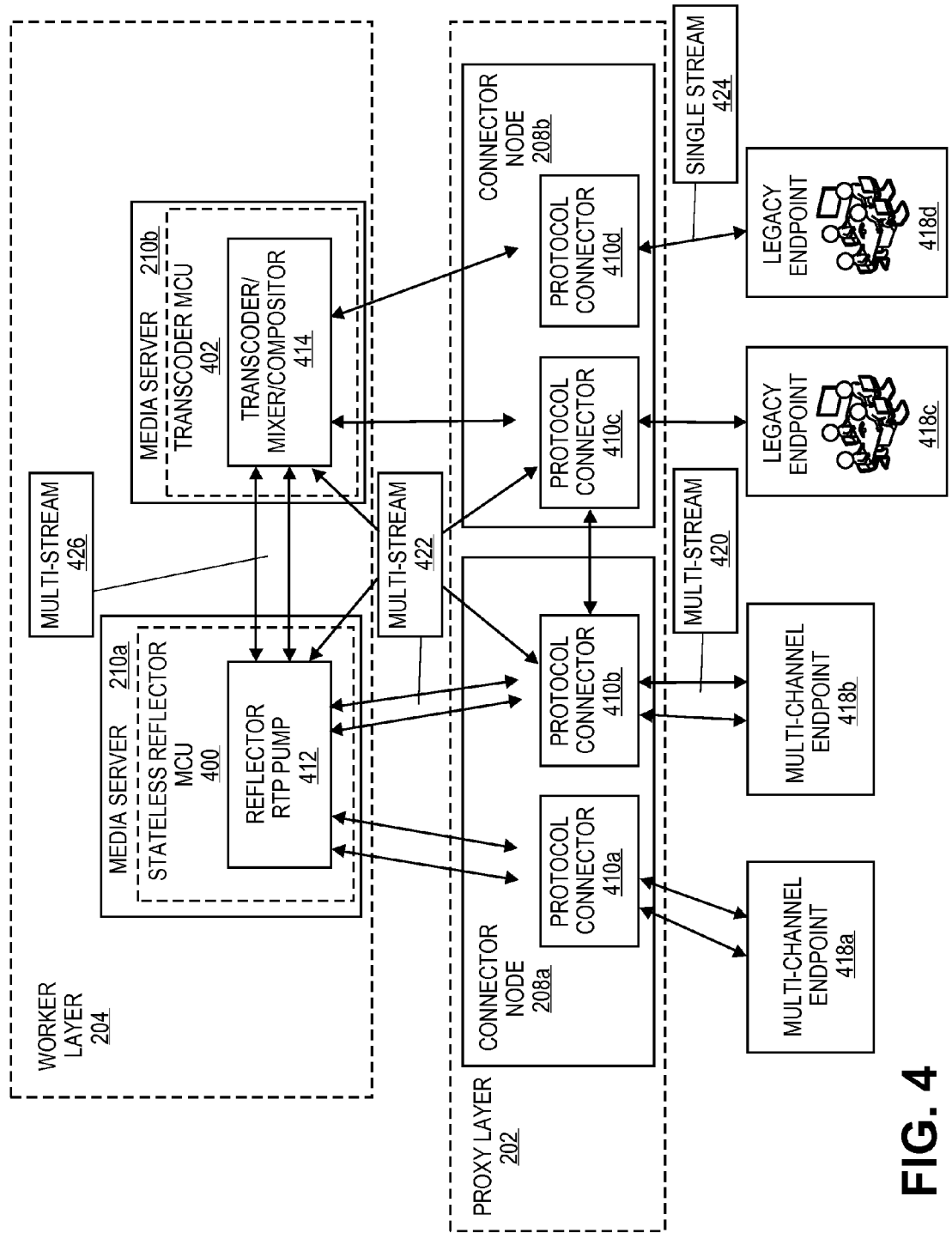
FIG. 4 depicts an exemplary system in accordance with some embodiments of the invention.

FIG. 4 is an exemplary system in accordance with some embodiments of the invention. FIG. 4 illustrates a stateless reflector MCU 400 used in combination with a transcoder MCU 402 in a worker layer 204 of the POP architecture 200 in a globally distributed infrastructure 100 for a video conferencing system. Those with skill in the art will recognize the present invention is not restricted to just one reflector MCU communicating with one transcoder MCU, and that communication can occur between any number of reflector MCUs and transcoder MCUs. By way of example, one or more reflector MCUs and/or transcoder MCUs can communicate with each other in a star topology. The stateless reflector MCU 400 and transcoder MCU 402 communicate with other elements to handle media processing for a video conferencing session, including, but not limited to, the following: elements in the worker layer 204, business/data layer 206, other reflector MCUs 400, and other transcoder MCUs 402. Instructions may be provided to the reflector MCU 400 and transcoder MCU 402 by protocol connectors 410*a-d* (collectively 410) managing media processing for their respective video conference participant endpoint devices 418*a-d* (collectively 418). Each element may be implemented with software, specially configured hardware, and/or any combination thereof.

Participant devices may execute or request execution of a client application on the participant device to participate in the video conference. In some embodiments, one protocol connector 410 (e.g., 410*a*) is instantiated per participant device 418 (e.g., 418*a*) to ensure that one protocol connector 410 failure does not cause the entire video conference to fail. A new protocol connector 410 may be instantiated and/or spawned for the video conference participant endpoint device upon failure of the protocol connector.

As shown in FIG. 4, protocol connectors 410 may communicate with reflector MCUs 412, transcoder MCUs 402 (e.g., using multiple data stream communication 422 with protocol connectors 410*a* and 410*b*, and single stream communication with protocol connectors 410*c* and 410*d*, etc.), and other protocol connectors 410 to ensure media processing is performed for the respective participant endpoint 418 that the protocol connector 410 is supporting. In some embodiments, a protocol connector 410 that is supporting an endpoint executing the client application that has the capability to create a composite of data streams for the presentation of the video conference. The stateless reflector MCU 400 may ensure data streams are forwarded to the respective multi-channel endpoint 418*a* and 418*b* for composition. By moving the work of creating the composite data stream to the endpoints, work is moved out of the connector nodes 208 or MCU nodes 400 and 402 of the video conference system and the resources of the endpoints 418 may be utilized where possible to create a system with scalability.

As shown, such endpoints 418*a* and 418*b* may support sending and receiving of multiple data streams 420 and/or state information. Similarly, protocol connectors 410 may support multi-stream data stream communication 420 with endpoints 418. Whereas protocol connector 410*c* and 410*d* may support legacy endpoints 418*c* and 418*d* that receive and send single data streams 424.

In some embodiments, the endpoint 418*a* and 418*b* with composition capabilities may support one or more communication protocols for composition of received data streams, and as a result, protocol connector 410 (e.g., 410*b*) may utilize a transcoder MCU 402 to transcode data streams not supported by the client application at the participant device 418 to be sent for composition at the participant device 418. As shown, in FIG. 4, the endpoints 410*a* and 410*b* may support an RTP communication protocol and as such, the underlying reflector may be referred to as an "RTP pump."

Multiple data stream 426 communication may be used between the stateless reflector 400 and the transcoder MCU 402 to send only the necessary streams between the two MCUs. As a result, legacy endpoints 418*c* and 418*d* may experience higher quality video conferences. If legacy endpoints 418*c* and/or 418*d* that are connected to transcoder MCU 402 need to be visible and audible to all the endpoints connected to reflector MCU 400, then transcoded streams for each of the endpoints 418*c* and/or 418*d* are sent over to reflector MCU 400 using multiple data stream 426 communication. Similarly if multi-channel endpoints 418*a* and/or 418*b* that are connected to the reflector MCU 400 need to be visible and audible to all the endpoints connected to transcoder MCU 402, then streams for each of endpoints 418*a* and/or 418*b* are sent over to the transcoder MCU 402 using the multiple data stream 426 communication. As a result all legacy and multi-channel endpoints 418 get to see all endpoints that are visible and audible in any layout and the minimal number of streams are transcoded at the transcoder MCU 402 and traverse the multiple data stream communication path 426.

In some embodiments, protocol connectors 410*b* may communicate with other protocol connectors 410*c* in order to make adjustments in the provision of data streams to the various endpoint client applications and/or other elements for media processing.

Figure 5:
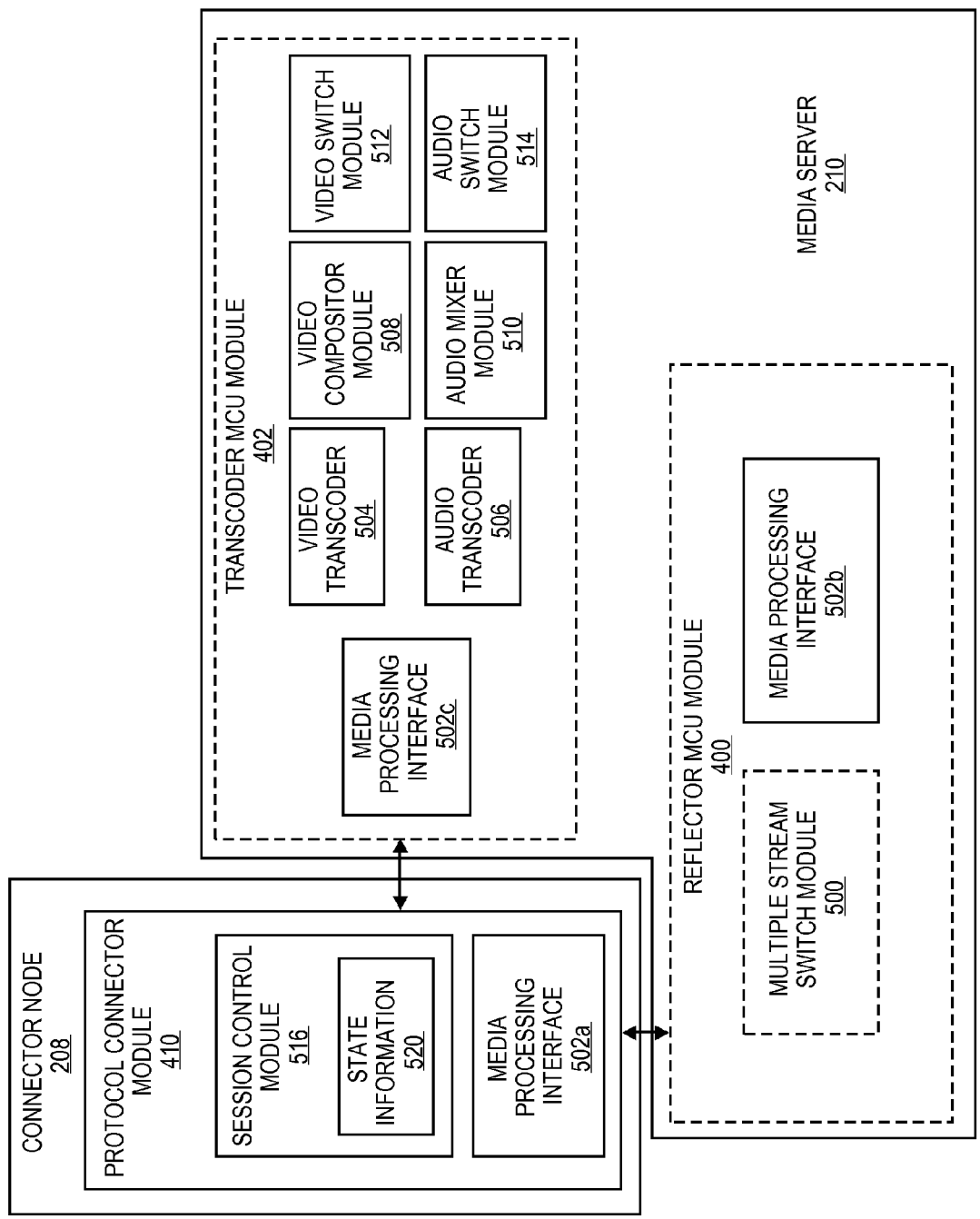
FIG. 5 depicts an exemplary system in accordance with some embodiments of the invention.

FIG. 5 is an exemplary system in accordance with some embodiments of the invention. FIG. 5 shows an example implementation of an embodiment that may utilize a reflector MCU module 400 and/or a transcoder MCU module 402. Reflector MCU module 400 and/or transcoder MCU module 402 may be implemented as software, software and hardware, and/or specially configured hardware. The reflector MCU module 400 may be instantiated and/or a new process may be spawned as needed for support of a video conference by the first protocol connector 410. In some embodiments, protocol connectors 410 may also share reflector MCUs 400 with other protocol connectors 410 and may reference the shared reflector MCU module 400 to make requests.

The underlying software and/or hardware for the reflector MCU 400 may be a multiple stream switch module 500, which operates as a network packet switch by switching packets between multiple sources and destinations. In some embodiments each protocol connector 410 provides instructions to a multiple stream switch module 500, including, but not limited to, the following: a forwarding table, bandwidth shaping instructions, requests to restart, and/or any other instructions for a switch. For example, a forwarding table may be loaded on to the switch to provide instructions on forwarding the data streams between a source and a destination. In some embodiments, if a protocol connector module 410*a* wants to see video from the endpoint 418*b* supported by protocol connector module 410*b*, it will send instructions to switch module 500 to forward to protocol connector 410*a* all video packets whose source is protocol connector 410*b*. In some embodiments, if protocol connector 410*a* wants to wants to see video from the endpoint 418*b* supported by protocol connector module 410*b*, but due to a bandwidth constraints at endpoint 418*a* it needs to receive a lower packet or frame rate of the video, it will send instructions to switch module 500 to forward to protocol connector 410*a* a subset of video packets whose source is protocol connector 410*b*. The subset could be every alternate packet thus reducing the frame rate of the video or only packets from a single substream of multi stream video stream.

Similarly, a transcoder MCU module 402 may be implemented with software, hardware, and/or any combination thereof. The transcoder MCU module 402 may be implemented as software and instantiated as need by one or more protocol connectors 410. Similar to the reflector MCU module 400, the software, hardware, and/or combination thereof of the transcoder MCU module 402 may be shared between protocol connectors and the protocol connector may reference the transcoder MCU module 402. The transcoder module may have the following elements: a media processing interface 502*c*, a video transcoder 504, an audio transcoder 506, a video compositor module 508, an audio mixer module 510, a video switch module 512, an audio switch module 514 and/or any other module used for transcoding and/or media processing to form a composite of data streams. A media processing interface 502a, 502b, and 502c (collectively 502) is an application programming interface provided between the elements: protocol connector module 410, transcoder MCU module 402, and/or reflector MCU module 400 to allow each of the elements to communicate, send requests, and receive requests. For example, the transcoder MCU 402 can communicate with any protocol connector 410, reflector MCU 400, and/or transcoder MCUs 402. Similarly, protocol connectors 410 may communicate with other protocol connectors 410, transcoder MCU modules 402, and/or reflector modules 400. The video transcoder 504 and audio transcoder 506 may decode the data streams and encode the streams into a supported communication protocol. The video compositor module 508 and the audio mixer module 510 may be used to combine streams into composite or mixed streams. Video switch module 512 and audio switch module 514 may be used to send instructions to the underlying switch sending data streams to endpoint devices.

The session control module 516 may control the video conference session and have access to the state information 520 for the video conference session and the endpoint supported by the protocol connector 410. In some embodiments, the session control module 516 may be a reference to a meeting session level video conference controller accessible to protocol connectors 410 (e.g., a singleton design pattern ensuring a single point of reference and control of the meeting session that may be referenced by protocol connectors of the video conference). State information 520 may be stored with the protocol connectors 410 and/or within data storage, such as file system, database, and/or any other data store to allow for media processing elements to be restarted or easily recreated with the video conference session and endpoint state information 520. Although an implementation is depicted with the state information 520 stored at the protocol connectors 410, those with skill in the art will recognize that any element of the video conference system may store and/or retrieve the state information from data storage, such as, a central call/video conference controller module. By way of example, a video conference controller executing on the POP may retrieve the state information to reset and/or create new protocol connector modules 410, transcoder MCU modules 402, and/or reflector MCU modules 400.

Figure 6A:
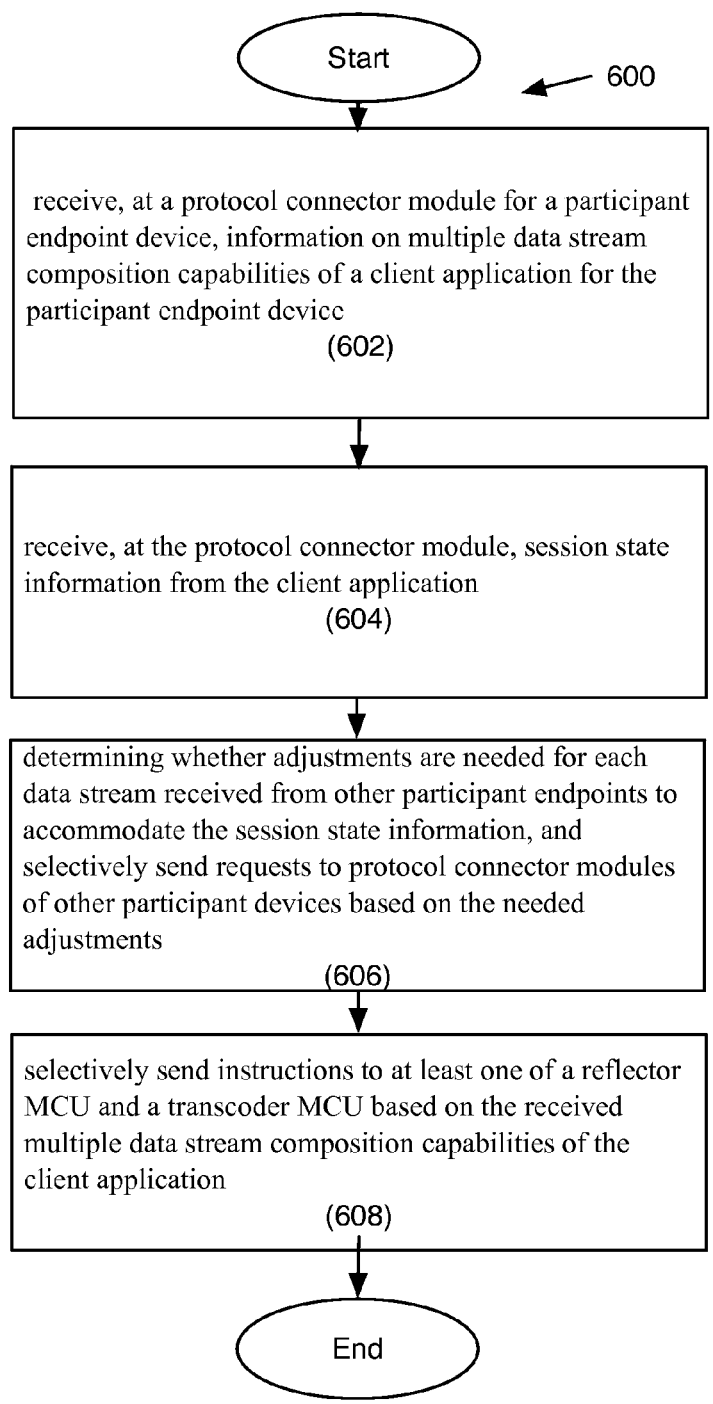
FIG. 6A is a flowchart for an exemplary process in accordance with some embodiments of the invention.

FIG. 6A is a flowchart 600 for an exemplary process in accordance with some embodiments of the invention. A protocol connector module may receive information on multiple data stream composition capabilities of a client application for a participant endpoint device (602). The protocol connector module handles the media processing for the participant endpoint device and communicates with other video conference elements to ensure the proper media processing is performed for the endpoint device. The protocol connector module may perform a "handshake" with the endpoint device by requesting information from the endpoint as to the capabilities of the client application and/or the resources of the endpoint device (e.g., processing resources, battery life, access to a LAN/WAN network, software application name, vendor, version, etc.) to determine whether the client application can handle creation of a composite data stream at the endpoint device. In some embodiments, the capabilities of the endpoint device may change over time and the system may adjust the handling of data streams accordingly. For example, the battery life of the endpoint device may change over time, and the media processing for the composite may be moved away from the endpoint device to the video conference system, if the protocol connector receives notification of a lack of resources at the endpoint device.

Although examples are provided with the handshake to determine capabilities of the endpoint device and assignment of reflector or transcoding MCU to handle the data stream is described as being done at a front end server or proxy in-line layer between the client and the transcoder/reflector servers, those with skill in the art will recognize that the same functionality could be provided and implemented using other designs. For example, such decisions could also be made at a central video conference controller for the system that is redirecting the clients to a transcoder or reflector.

Figure 8:
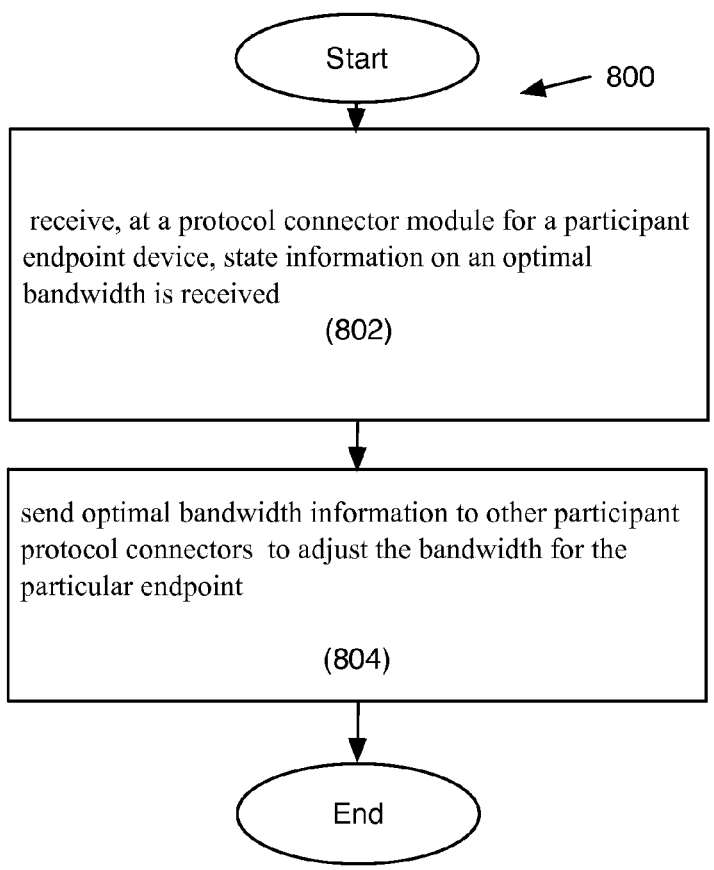
FIG. 8 is a flowchart for an exemplary process in accordance with some embodiments of the invention.

The protocol connector module may receive session state information from the client application (604). The received session state information may indicate whether adjustments are needed by the client application for the presentation of the video conference at the participant endpoint device (606). For example, the session state information may indicate adjustments that may be necessary or optimal in the provision of data streams from one or more other participant endpoint devices of the conference. Instructions may be selectively sent to the protocol connector modules supporting each of the one or more other participant endpoint devices based on the needed adjustments (606). FIG. 8 provides an example of a protocol connector module in communication with other elements to support the endpoint.

Figure 6B:
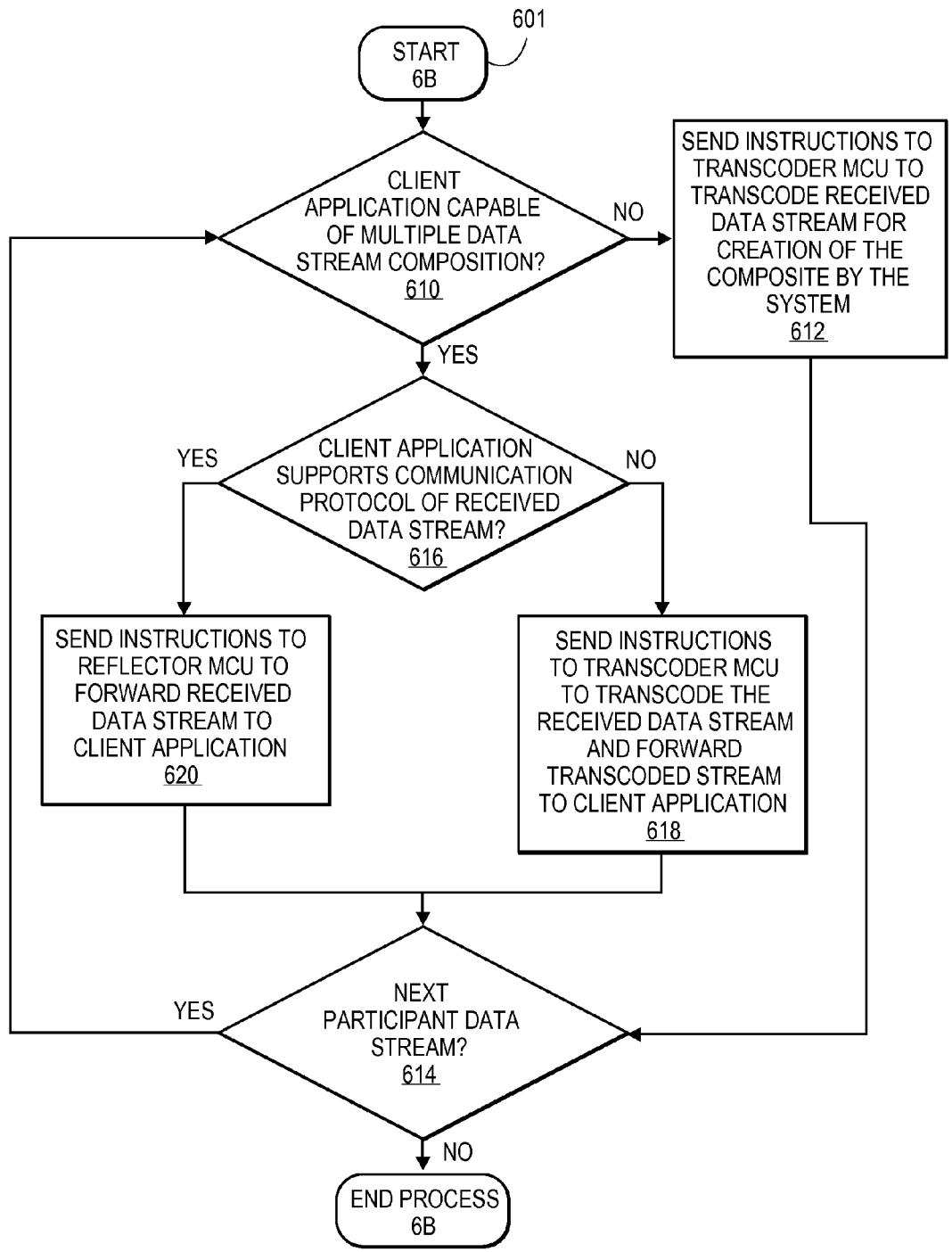
FIG. 6B is a flowchart for an exemplary process in accordance with some embodiments of the invention.

Instructions may be selectively sent by the protocol connector module: to at least one of a reflector MCU and a transcoder MCU, other protocol connector modules, and/or other elements of the video conference system to handle media processing for each of the received video conference data streams in order to create the composite (608). Instructions may be selectively sent based on the received multiple data stream composition capabilities of the client application (608). If the client application is capable of receiving multiple data streams and creating a composite from the multiple data streams, then instructions are sent to a reflector MCU to forward streams from other participant devices (when the communication protocol of the other participant device is supported by the client application) to the participant endpoint for composition by the client application. For other participant data streams utilizing communication protocols that the client application may not support, the protocol connector may send instruction to a transcoder MCU to transcode the participant data stream before sending the data stream for composition at the client application. If multiple stream composition is not supported, then composition is performed by the video conference system and the composite is forwarded to the client application. FIG. 6B provides more detail on processes for media processing using a reflector and/or a transcoder MCU.

FIG. 6B is a flowchart 601 for an exemplary process in accordance with some embodiments of the invention. Flowchart 601 is an example of handling media processing for each of the received data streams from participants of the video conference. If the client application is not capable of multiple data stream composition (610), then instructions are sent to a transcoder MCU to transcode received data streams (when necessary) for creation of the composite by the video conference system elements (612). Data streams may be transcoded to a predefined common communication protocol for creation of the composite. In some embodiments, the protocol connector may instantiate a new transcoder MCU module and/or use an existing transcoder MCU module to handle the logic of providing instructions to the underlying switch hardware, such as providing a forwarding table to the switch and requesting upshifting/downshifting of bandwidth.

The process is repeated for each of the participant data streams (614). The composite may then be forwarded to the client application for presentation at the endpoint device.

Alternatively, if the client application is capable of multiple data stream composition (610) and the client application supports the communication protocol of the received data stream (616), then instructions are sent to the reflector MCU to forward received data streams from other participants to the client application (620). Instructions may then be sent to the reflector MCU to forward the received data stream from other endpoints to the client application for creation of the composite (620). The process is repeated for the next participant data stream (614) or the process ends if there are no more participant data streams (614). In some embodiments, state information is sent to the protocol connector module for the endpoint of the received data stream, if adjustments are necessary. Session state information may be provided to the protocol connector for the endpoint to make adjustments to the data stream.

Alternatively, if the client application does not handle the communication protocol of the received data stream (616), then instructions may be sent to the transcoder MCU to transcode the received data stream to a communication protocol that the client application can support and forward the transcoded data stream to the client application. The process is repeated for each of the participant data streams (614). The composite may then be forwarded to the client application for presentation at the endpoint device.

Figure 7:
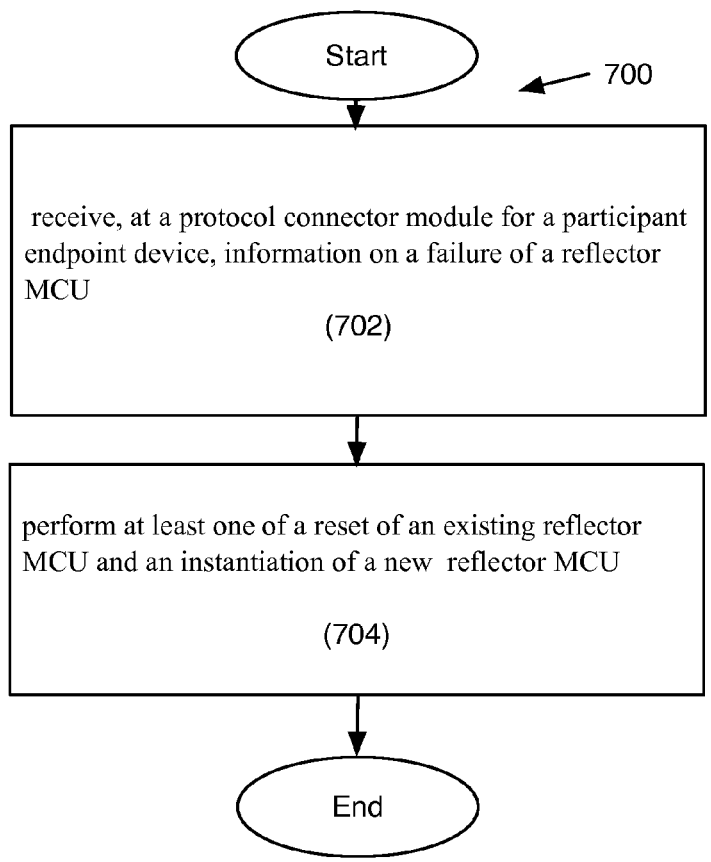
FIG. 7 is a flowchart for an exemplary process in accordance with some embodiments of the invention.

FIG. 7 is a flowchart for an exemplary process in accordance with some embodiments of the invention. Information may be received by an element of the video conferencing system indicating a failure of a reflector MCU or transcoder MCU (702). For example, the protocol connector relying on a reflector MCU or transcoder MCU may receive an indication from another element of the system, such as a session control module of a protocol connector, and/or error handling modules for the system at the application level, node level and/or system level. The saved state information may be used to instantiate a new reflector MCU or transcoder MCU or restart/reset an existing reflector MCU or transcoder MCU (704). For example, if a session control module of the protocol connector received information that the reflector MCU or transcoder MCU has failed, then the protocol control module may instantiate a new reflector or transcoder MCU and/or send instructions to a reflector providing instructions and state information for handling the endpoint that needs support. The state information may be accessible from data storage and/or the protocol connector may request updated state information from other protocol connectors and/or the endpoint that the protocol connector is supporting.

FIG. 8 is a flowchart for an exemplary process in accordance with some embodiments of the invention. When state information is received on an optimal bandwidth is received (802), then the optimal bandwidth information may be sent to other participant protocol connectors (804) to adjust the bandwidth for the particular endpoint that the protocol connector is supporting. For example, if there is too much packet loss reported by a protocol connector for an endpoint, a reduction may be made to reduce bandwidth for the data streams the endpoint is receiving until the packet loss subsides. Once the protocol modules determine the optimal bandwidth, the protocol connector instructs the transcoding MCU to encode the bit stream with the bandwidth. In the case of a reflecting MCU, the protocol connector tells other protocol modules (via the reflector and/or directly using an API) to reduce the bit stream to the chosen bandwidth. The other protocol modules may reduce their bandwidth by changing the instructions to the reflector MCU which then simply forwards their packets based on these instructions.

State information may include, but is not limited to: bit rate, current packet jitter, packet loss, bandwidth, and/or any other data indicating the operational status for the video conference data streams. State information parameters and values may be continuously measured and reported between protocol connectors and to/from the endpoint that the protocol connector is supporting. By managing and storing video conference state separate from the reflector, the system is overall more reliable because the reflector can be easily restarted and the logic is removed from the reflector to allow the reflector to spend all processing time on forwarding streams. Such a design for the reflector design allows for optimization of high performance hardware or very purpose built simple software that only knows have to forward packets based on instructions given to it by the protocol connector modules. In some embodiments, decisions around how to filter and forward packets are made in the protocol module, and the reflector focuses purely on packet forwarding. By way of example, with recent advances in Software Designed Networking (SDN), a simple L2/L3 capable switching hardware may be made to act as a reflector with some modifications.

Figure 9:
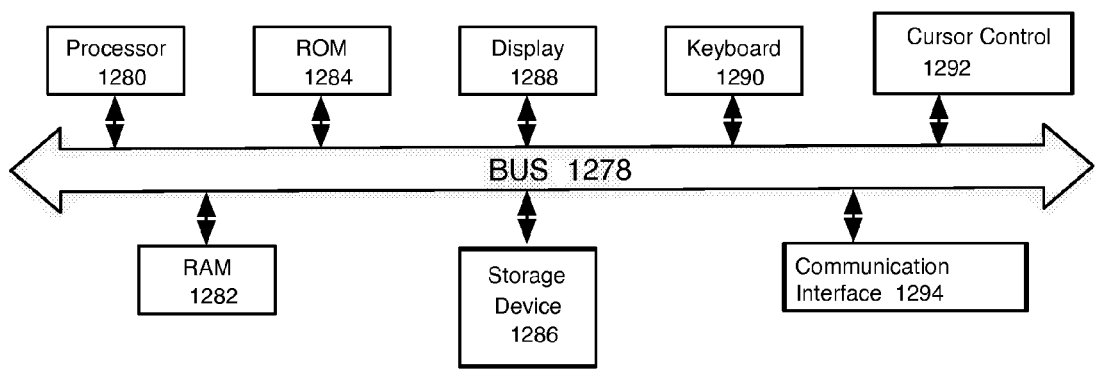
FIG. 9 depicts an exemplary system in accordance with some embodiments of the invention.

FIG. 9 is an exemplary system in accordance with some embodiments of the invention.

In the foregoing description, certain flow diagrams have been shown and processes described in relation to those flow diagrams that provide a reference for discussion purposes. In an actual implementation of the methods of the present invention, the steps can comprise event-driven routines that can run in parallel and can be launched and executed other than as shown by the simple depiction in the flow diagrams. In short, the particular order of the steps in the flow diagrams is illustrative of the invention, but not limiting of the various permutations that can be achieved in a given embodiment. Accordingly, it is the performance of the steps recited in the claims appended below which is pertinent, and not the order of operation of the steps themselves.

Further the procedures described herein may involve the use of various computer systems and computer readable storage media having computer-readable instructions stored thereon. FIG. 9 provides an example of a computer system 1276 that is representative of any of the computer systems or electronic devices discussed herein. Note, not all of the various computer systems may have all of the features of computer system 1276. Computer systems such as computer system 1276 may be referred to by other names, for example, as endpoints, hand-held devices, mobile devices, smart phones, multiprocessor systems, microprocessor-based electronic devices, digital signal processor-based devices, networked computer systems, minicomputers, mainframe computers, personal computers, servers, clients, laptop computers, tablet computers, and the like. Such labels are not critical to the present invention.

Computer system 1276 includes a bus 1278 or other communication mechanism for communicating information, and a processor 1280 coupled with the bus for processing information. Computer system 1276 also includes a main memory 1282, such as a random access memory (RAM) or other dynamic storage device, coupled to the bus for storing information and instructions to be executed by the processor. Main memory 1282 also may be used for storing temporary variables or other intermediate information during execution of instructions to be executed by processor 1280. Computer system 1276 further includes a read only memory (ROM) 1284 or other static storage device coupled to the bus for storing static information and instructions for the processor 1280. A storage device 1286, which may be one or more of a hard disk, flash memory-based storage medium, or other storage medium, is provided and coupled to the bus 1278 for storing information and instructions (e.g., operating systems, applications programs and the like).

Computer system 1276 may be coupled via the bus 1278 to a display 1288, such as a liquid crystal or light emitting diode display, for displaying information to a user. An input device 1290, such as a keyboard including alphanumeric and other keys, is coupled to the bus 1278 for communicating information and command selections to the processor. In some embodiments, the keyboard will be a software construct rendered via a touch screen display 1288. Another type of user input device is cursor control device 1292, such as a mouse, a trackball, cursor direction keys, and/or any other input device for communicating direction information and command selections to processor 1280 and for controlling cursor movement on the display. Where a touch screen display is used, cursor control functions may be implemented using finger-based gestures directly on the display. Other user interface devices, such as microphones, speakers, etc. are not shown in detail but may be involved with the receipt of user input and/or presentation of output.

The processes referred to herein may be implemented using a processor 1280 executing appropriate sequences of computer-readable instructions contained in main memory 1282. Such instructions may be read into main memory from another computer-readable medium, such as storage device 1286, and execution of the sequences of instructions contained in the main memory causes the processor to perform the associated actions. In alternative embodiments, hard-wired circuitry or firmware-controlled processing units (e.g., field programmable gate arrays) may be used in place of or in combination with processor 1280 and its associated computer software instructions to implement the invention. The computer-readable instructions may be rendered in any computer language including, without limitation, C#, C/C++, assembly language, markup languages (e.g., HTML, SGML, XML, VoXML), JavaScript, and the like, as well as object-oriented environments such as the Common Object Request Broker Architecture (CORBA), Java™ and the like. In general, the flow diagrams are intended to be illustrative of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying" or the like, refer to the action and processes of an appropriately programmed computer system, such as computer system 1276 or similar electronic computing device, that manipulates and transforms data represented as physical (electronic) quantities within its registers and memories into other data similarly represented as physical quantities within its memories or registers or other such information storage, transmission or display devices.

Computer system 1276 also includes a communication interface 194 coupled to the bus 1278. Communication interface 1294 provides a two-way data communication channel with a computer network, such as a network, which provides connectivity to and among the various servers discussed above. For example, communication interface 194 may be a local area network (LAN) card (wired and/or wireless) to provide a data communication connection to a compatible LAN, which itself is communicatively coupled to the Internet through one or more Internet service provider networks. The precise details of such communication paths are not critical to the present invention. What is important is that computer system 1278 can send and receive messages and data through the communication interface and in that way communication with hosts accessible via the Internet. Computer system 1276 may include additional capabilities and facilities, such as a power unit, which may comprise a battery, a power port, one or more antennae, one or more data ports, and one or more wireless communication modules. The various databases described herein are computer-based record keeping systems. Stated differently, these databases are each a combination of computer hardware and software that act together to allow for the storage and retrieval of information (data). Accordingly, they may resemble computer system 1276, and are often characterized by having storage mediums capable of accommodating significant amounts of information.

While the preferred embodiments have been shown and described, it will be understood that there is no intent to limit the invention by such disclosure, but rather, is intended to cover all modifications and alternate constructions falling within the spirit and scope of the invention.

What is claimed:

1. A method comprising:
   receiving, at a first protocol connector module of a video conference system, information on multi-data stream composition capabilities of a client application for a participant endpoint device of a video conference;
   receiving session state information for creation of a composite of received video conference data streams for presentation at the client application; and
   selectively sending instructions for handling media processing for each of the received video conference data streams from other participant devices based on the received multi-data stream composition capabilities information of the client application, wherein the selective sending of instructions for a received data stream comprises:
   (1) if the client application is capable of multi-data stream composition for a communication protocol of the received data stream, the first protocol connector module sends state information to a respective other protocol connector module receiving the data stream from the other participant device; and
      the first protocol connector module sends instructions to a reflector multipoint control unit to forward the received data stream to the client application for creation of the composite of video conference data streams;
   (2) Otherwise, the first protocol connector module sends instructions to a transcoder multipoint control unit, the instructions comprising at least one of:
      a) transcode the received data stream in accordance with the state information and transcode the received data stream into a communication protocol the client application is capable of processing for creation of the composite; and send the transcoded data stream to the client application; and
      b) transcode the received data stream for creation of the composite of video data streams by the video conference system in accordance with the state information; and send the composite of the video data streams to the client application.

2. The method of claim 1, further comprising:
receiving information on a failure of at least one of the reflector multipoint control unit and the transcoder multipoint control unit and updating the state information;
instantiating at least one of a new reflector multipoint control unit module and a new transcoder multipoint control unit module; and
sending the updated state information to each respective other protocol connector module for the other participant devices of the video conference.

3. The method of claim 1, wherein the state information is at least one of information on jitter, bandwidth, and packet loss, and the state information is stored in the first protocol connector module and not the reflector multipoint control unit.

4. The method of claim 1, further comprising:
receiving state information on an optimal bandwidth for the client application; and
sending the optimal bandwidth information to each respective other protocol connector of the other endpoint devices, wherein each respective other protocol connector for the other endpoint device instructs a transcoder multipoint control unit to encode a bit stream with the optimal bandwidth before forwarding the data stream to the client application.

5. The method of claim 1, further comprising:
selectively sending multiple data streams between the reflector multipoint control unit and transcoder multipoint control unit for data streams of endpoints that have been selected to be at least one of visible and audible on the video conference.

6. The method of claim 1, wherein the reflector multipoint control module is a stateless packet switch, the state information is stored in data storage separate from the reflector multipoint control module, and the first protocol connector module retrieves the state information from data storage and sends instructions to the reflector multipoint control module to forward data packets to at least one of: one or more of the other protocol connector modules, a second reflector multipoint control unit, and the transcoder multipoint control unit or a second transcoder multipoint control unit.

7. A non-transitory computer readable medium storing computer-executable instructions, which instructions when executed by a processor cause the processor to perform steps comprising:
receive, at a first protocol connector module of a video conference system, information on multi-data stream composition capabilities of a client application for a participant endpoint device of a video conference;
receive session state information for creation of a composite of received video conference data streams for presentation at the client application; and
selectively send instructions for handling media processing for each of the received video conference data stream from other participant devices based on the received multi-data stream composition capabilities information of the client application, wherein the selective sending of instruction for a received data stream comprises:
(1) if the client application is capable of multi-data stream composition for a communication protocol of the received data stream, the first protocol connector module sends state information to a respective other protocol connector module receiving the data stream from the other participant device; and
the first protocol connector module sends instructions to a reflector multipoint control unit to forward the received data stream to the client application for creation of the composite of video conference data streams;
(2) Otherwise, the first protocol connector module sends instructions to a transcoder multipoint control unit, the instructions comprising at least one of:
a) transcode the received data stream in accordance with the state information and transcode the received data stream into a communication protocol the client application is capable of processing for creation of the composite; and send the transcoded data stream to the client application; and
b) transcode the received data stream for creation of the composite of video data streams by the video conference system in accordance with the state information; and send the composite of the video data streams to the client application.

8. The non-transitory computer readable medium of claim 7, wherein the instructions further cause the processor to:
receive information on a failure of at least one of the reflector multipoint control unit and the transcoder multipoint control unit and update the state information;
instantiate at least one of a new reflector multipoint control unit module and a new transcoder multipoint control unit module; and
send the updated state information to each respective other protocol connector module for the other participant devices of the video conference.

9. The non-transitory computer readable medium of claim 7, wherein the state information is at least one of information on jitter, bandwidth, and packet loss and the state information is stored in the first protocol connector module and not the reflector multipoint control unit.

10. The non-transitory computer readable medium of claim 7, wherein the instructions further cause the processor to:
receive state information on an optimal bandwidth for the client application; and
send the optimal bandwidth information to each respective other protocol connector of the other endpoint devices, wherein each respective other protocol connector for the other endpoint device instructs a transcoder multipoint control unit to encode a bit stream with the optimal bandwidth before forwarding the data stream to the client application.

11. The non-transitory computer readable medium of claim 7, wherein the instructions further cause the processor to:
selectively send multiple data streams between the reflector multipoint control unit and transcoder multipoint control unit for data streams of endpoints that have been selected to be at least one of visible and audible on the video conference.

12. The non-transitory computer readable medium of claim 7, wherein the reflector multipoint control module is a stateless packet switch, the state information is stored in data storage separate from the reflector multipoint control module, and the first protocol connector module retrieves the state information from data storage and sends instructions to the reflector multipoint control module to forward data packets to at least one of: one or more of the other protocol connector modules, a second reflector multipoint control unit, and the transcoder multipoint control unit or a second transcoder multipoint control unit.

13. A video conference system comprising:
a first protocol connector for managing a video conference session for an endpoint device, and sending instructions to at least one of a reflector multipoint control unit and a transcoder multipoint control unit to handle data streams received for the video conference, wherein:
the reflector multipoint control unit forwards one or more data streams in accordance with received instructions from the first protocol connector; and
a processor configured to:
receive, at the first protocol connector module, information on multi-data stream composition capabilities of a client application for a participant endpoint device of a video conference;
receive session state information for creation of a composite of received video conference data streams for presentation at the client application; and
selectively send instructions for handling media processing for each of the received video conference data stream from other participant devices based on the received multi-data stream composition capabilities information of the client application, wherein the selective sending of instruction for a received data stream comprises:
(1) if the client application is capable of multi-data stream composition for a communication protocol of the received data stream, the first protocol connector module sends state information to a respective other protocol connector module receiving the data stream from the other participant device; and
the first protocol connector module sends instructions to the reflector multipoint control unit to forward the received data stream to the client application for creation of the composite of video conference data streams;
(2) Otherwise, the first protocol connector module sends instructions to the transcoder multipoint control unit, the instructions comprising at least one of:
a) transcode the received data stream in accordance with the state information and transcode the received data stream into a communication protocol the client application is capable of processing for creation of the composite; and send the transcoded data stream to the client application; and
b) transcode the received data stream for creation of the composite of video data streams by the video conference system in accordance with the state information; and send the composite of the video data streams to the client application.

14. The system of claim 13, wherein the processor is further configured to:
receive information on a failure of at least one of the reflector multipoint control unit and the transcoder multipoint control unit and update the state information;
instantiate at least one of a new reflector multipoint control unit module and a new transcoder multipoint control unit module; and
send the updated state information to each respective other protocol connector module for the other participant devices of the video conference.

15. The system of claim 13, wherein the state information is at least one of information on jitter, bandwidth, and packet loss and the state information is stored in the first protocol connector module and not the reflector multipoint control unit.

16. The system of claim 13, wherein the processor is further configured to:
receive state information on an optimal bandwidth for the client application; and
send the optimal bandwidth information to each respective other protocol connector of the other endpoint devices, wherein each respective other protocol connector for the other endpoint device instructs a transcoder multipoint control unit to encode a bit stream with the optimal bandwidth before forwarding the data stream to the client application.

17. The system of claim 13, wherein the processor is further configured to:
selectively send multiple data streams between the reflector multipoint control unit and transcoder multipoint control unit for data streams of endpoints that have been selected to be at least one of visible and audible on the video conference.

18. The system of claim 13, wherein the reflector multipoint control module is a stateless packet switch, the state information is stored in data storage separate from the reflector multipoint control module, and the first protocol connector module retrieves the state information from data storage and sends instructions to the reflector multipoint control module to forward data packets to at least one of: one or more of the other protocol connector modules, a second reflector multipoint control unit, and the transcoder multipoint control unit or a second transcoder multipoint control unit.

* * * * *